United States Patent [19]

Sugita et al.

[11] Patent Number: 5,461,499
[45] Date of Patent: Oct. 24, 1995

[54] NON-REGULAR REFLECTION TYPE HOLOGRAPHIC MIRROR AND METHOD OF PRODUCING THE SAME IN A REFLECTION TYPE DISPLAY APPARATUS FOR VEHICLE

[75] Inventors: Masaya Sugita; Toshiaki Fujiwara; Kazuyuki Sasaki; Tadashi Iino; Yoshiyuki Furuya; Takanori Watanabe; Hidenobu Korenaga, all of Shizuoka, Japan

[73] Assignee: Yazaki Corporation, Tokyo, Japan

[21] Appl. No.: 68,667

[22] Filed: May 28, 1993

[30] Foreign Application Priority Data

May 29, 1992 [JP] Japan .................................. 4-139032
Sep. 25, 1992 [JP] Japan .................................. 4-256269

[51] Int. Cl.$^6$ ........................................................ G03H 1/00
[52] U.S. Cl. ............................. 359/13; 359/16; 359/631; 345/7
[58] Field of Search ............................. 459/13, 15, 630, 459/14, 16, 631, 632, 633, 868; 345/7

[56] References Cited

U.S. PATENT DOCUMENTS

| | | | |
|---|---|---|---|
| 3,589,796 | 6/1971 | Schaefer | 359/631 |
| 4,613,200 | 9/1986 | Hartman | 345/7 |
| 4,729,634 | 3/1988 | Raber | 359/630 |
| 4,763,990 | 8/1988 | Wood | 359/15 |
| 4,830,464 | 5/1989 | Cheysson et al. | 345/8 |
| 4,834,474 | 5/1989 | George et al. | 359/15 |
| 4,892,386 | 1/1990 | Suzuki et al. | 359/630 |
| 4,932,731 | 6/1990 | Suzuki et al. | 359/630 |
| 5,166,818 | 11/1992 | Chase et al. | 359/868 |
| 5,229,754 | 7/1993 | Aoki et al. | 359/631 |
| 5,291,316 | 3/1994 | Haberman et al. | 359/13 |
| 5,333,071 | 7/1994 | Ishikawa et al. | 359/15 |
| 5,357,372 | 10/1994 | Chen et al. | 359/631 |
| 5,379,132 | 1/1995 | Kuwayama et al. | 345/7 |

FOREIGN PATENT DOCUMENTS 3712663 4/1987 Germany .
2-248914 10/1990 Japan ........................ 359/16

OTHER PUBLICATIONS

Rao, et al., "Holographic methods for the fabrication of various types of mirrors", US Journal Review of Scientific Instruments, vol. 51, 1980, pp. 809–813.

Primary Examiner—Paul M. Dzierzynski
Assistant Examiner—John Juba, Jr.
Attorney, Agent, or Firm—Armstrong, Westerman, Hattori, McLeland & Naughton

[57] ABSTRACT

A non-regular reflection type holographic mirror which can reduce, when mounted as a reflection plate on a windshield of a vehicle, the inclination of a display image visually discerned by reflection and a process of manufacturing the same. The holographic mirror comprises a hologram plate including a transparent support member and a photosensitive agent layer formed on the transparent support member and having interference fringes formed therein such that the hologram plate has a function of a concave mirror at a first portion of the hologram plate and another function of a convex mirror at a second portion of the hologram plate on opposite sides of a horizontal center line. A reflection type display apparatus for a vehicle employing a non-regular reflection type hologram or a regular reflection type hologram constituting a concave mirror as a hologram combiner wherein a virtual image of a display unit is reversed into an erect image and compensated for in contraction to improve the discernibility.

7 Claims, 16 Drawing Sheets

F I G. 1
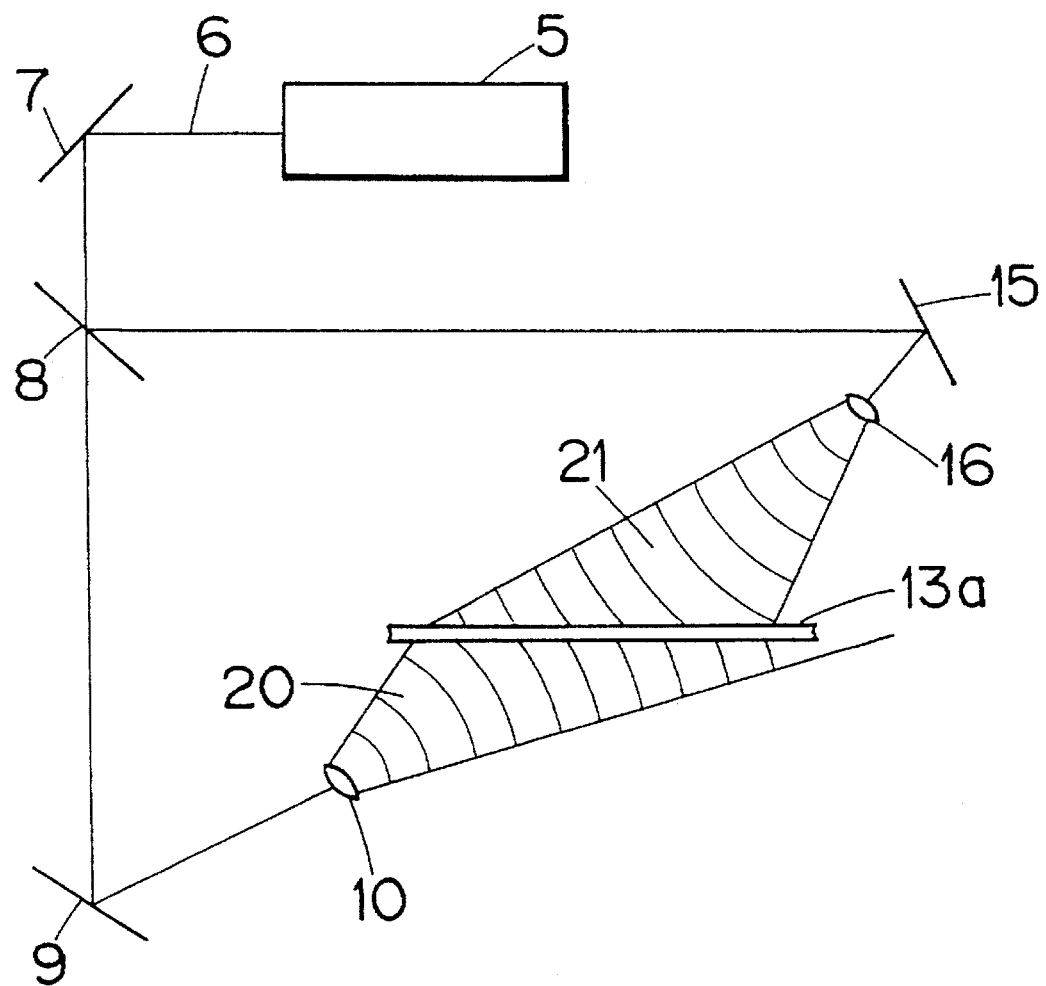

NON-REGULAR REFLECTION TYPE HOLOGRAPHIC MIRROR AND METHOD OF PRODUCING THE SAME IN A REFLECTION TYPE DISPLAY APPARATUS FOR VEHICLE

BACKGROUND OF THE INVENTION

1. Field of the Invention

This invention relates to a non-regular reflection type holographic mirror and a method of producing the same as well as a reflection type display apparatus for a vehicle, and more particularly to a non-regular reflection type holographic mirror which is mounted on a surface of a windshield of a vehicle to reflect an image of a display unit, which displays information of the vehicle, to the point of view of a driver of the vehicle so as to be visually discerned by the driver and to a method of producing the non-regular reflection type holographic mirror as well as a reflection type display apparatus for a vehicle which employs a holographic mirror.

2. Description of the Related Art

Reflection type display deices for vehicles are already known wherein display light of a display unit is reflected from a reflection mirror to remotely display a display image as a virtual image forwardly of a vehicle. A typical one of such reflection type display apparatus is a head-up display (HUD) apparatus wherein a reflection mirror is used as a combiner. An exemplary one of such conventional head-up display apparatus is shown in FIG. 11. Referring to FIG. 11, a display unit 1 for displaying information of a vehicle thereon is disposed with a display surface thereof directed upwardly in a dashboard 2 of the vehicle. Light emitted from a display image of the display unit 1 is introduced through an opening formed in the dashboard 2 to and reflected by a combiner constituted from a reflection portion 4 on an inner surface of a windshield 3 of the vehicle so that it is introduced to a point E of view of a driver of the vehicle. Consequently, the driver can visually discern a virtual image X of the display image forwardly of the vehicle.

In the reflection type display apparatus of the construction described above, the location of the display unit 1 is restricted by the inclination angle of the windshield 3, and there is little freedom in designing of the location. Thus, an improved display apparatus is proposed wherein a non-regular reflection type hologram having different incidence and emergence angles is mounted on the windshield to increase the degree of freedom in designing the location of the display unit.

A non-regular reflection type hologram mentioned above is produced in the following manner. Referring to FIG. 12, a laser beam 6 emitted from a laser oscillator 5 is reflected by a mirror 7 and then split into two beams of different directions by a beam splitter 8. One of the two beams is reflected by another mirror 9 and converted by an objective lens 10 and a convex lens 11 into parallel light, which is subsequently irradiated as object light 12 upon a surface of a hologram plate 13a. Meanwhile, the other of the two beams is reflected by a mirror 15 and then converted by an objective lens 16 and a convex lens 17 into parallel light, which is subsequently irradiated as reference light 18 upon the other surface of the hologram plate 13a opposite to the surface upon which the object light 12 is irradiated.

If the hologram plate 13a recorded in this manner is developed and fixed, then such a hologram 13 as shown in FIG. 13 is obtained. In particular, referring to FIG. 13, the hologram 13 has interference fringes which are inclined by an inclination angle θ with respect to the plane of a photosensitive agent layer 13c applied to a transparent support member 13b and are spaced from each other by a distance d. In this instance, the inclination angle θ and the distance d of the interference fringes can be determined in the following manner.

The wavelength of the object light 12 is represented by λ, and the angle at which the object light 12 is introduced to the surface of the photosensitive agent layer 13c of the hologram plate 13a is represented by $\theta_S$ while the refraction angle of the photosensitive agent layer 13b is represented by $\theta_S'$. Further, the incidence angle of the reference light 18 to the transparent support member 13b is represented by $\theta_R$, and the refraction angle of the transparent support member 13b is represented by $\theta_R'$. Since the refraction angles of the photosensitive agent layer 13c and the transparent support member 13b may be considered equal to each other.

the inclination angle $\theta = (\theta_S' \theta_R')/2$, and the distance $d = \lambda/2n \sin((\theta_S' + \theta_R')/2)$ where n is a refraction factor of the photosensitive agent layer 13c.

If the hologram 13 is mounted on the windshield 3 as shown in FIG. 14 so as to be used as a mirror, then since it does not reflect light regularly and has an incidence angle and an emergence angle which are different from each other even if the display unit 1 is located nearer to the driver side, the hologram 13 can introduce reflected light therefrom to the point E of view of the driver so that, from the point E of view, the virtual image X of the display image of the display unit 1 can be visually discerned rearwardly of the hologram 13. In this manner, where a non-regular reflection type mirror is used, if the characteristic of non-regular reflection of the non-regular reflection type mirror is suitably set, then the display unit 1 can be located at a position at which it cannot be located with a mirror of the regular reflection type. Consequently, the degree of freedom in designing of the location of the display unit 1 can be increased remarkably.

However, where a mirror of the non-regular reflection type described above is used, the virtual image X of the display image of the display unit 1 is visually discerned, as viewed from the point E of view of the driver, as a forwardly inclined collapsed image. In simple comparison between non-regular reflection and regular reflection, in the case of non-regular reflection, as shown in FIG. 15, light coming out from a point 1a of the display unit 1 comes to a point Xa; light coming out from another point 1c comes to another point Xc; and light coming out from a further point 1b comes to a further point Xb, thereby forming the virtual image X. In contrast, according to reflection of an imaginary mirror 11 of the regular reflection type, light coming from the points 1a, 1b and 1c comes to points Xa', Xc' and Xb', respectively, thereby forming another virtual image X'. Here, if the distances of the virtual images X and X' from the respective reflecting points are compared with each other, then the distance to the point Xa is longer by 2×La than the distance to the point Xa' while the distance to the point Xc is longer by 2×Lb than the distance to the point Xc'. Accordingly, as viewed from the point E of view of the driver, the virtual image of the display image of the display unit 1 is visually discerned as a forwardly inclined collapsed image. Therefore, when compared with the virtual image obtained by ordinary regular reflection, the virtual image obtained by non-regular reflection gives an unfamiliar feeling to the driver and deteriorates the discernibility of the driver.

Another head-up display apparatus wherein a reflection type hologram is employed as a combiner is shown in FIG.

16. Referring to FIG. 16, a display unit 1 for displaying various operation information of a vehicle thereon is disposed with a display surface thereof directed upwardly in a dashboard 2 of the vehicle. Light emitted from a display image of the display unit 1 is introduced through an opening 2a formed in the dashboard 2 to and reflected by a combiner constituted from a reflection type hologram 4, which is mounted fixedly on the dashboard 2 independently of a windshield 3 of the vehicle, so that it is introduced to a point E of view of a driver of the vehicle so as to allow the driver to visually discern the display image as a virtual image VI. In this instance, the hologram serves as a mirror for a particular wavelength band.

Depending upon the manner in which a hologram is recorded, the hologram can be provided with a function as a concave mirror or a convex mirror or as a mirror having a characteristic of the regular reflection type (in the case of $\theta_1=\theta_2$ in FIG. 9) or the non-regular reflection type (in the case of $\theta_1\neq\theta_2$ in FIG. 16) for a particular wavelength band similarly as described above. The hologram may be used in various manners such that it is mounted independently of the windshield of a vehicle or it is applied to the surface of the windshield or else it is recorded in a glass laminate of the windshield by applying emulsion of a photosensitive agent upon production of the windshield.

While the recording manner of a hologram combiner includes the regular reflection type and the non-regular reflection type as described above, when hologram combiners of the regular reflection recording type and the non-regular reflection recording type are compared with each other, a hologram combiner of the regular reflection recording type little suffers from the problems of fading out and chromatic aberration, but it has a problem that, since a regular reflection image from the rear surface of the hologram plate is formed on the same line of sight, it cannot be separated and cancelled effectively and makes a noise image. While a surface processing technique such as non-reflective coating of the surface of a hologram plate is available as a countermeasure against the program, this makes a factor of an increase of cost.

Meanwhile, in the case of a hologram combiner of the non-regular reflection recording type, while regular reflection images on the front and rear surfaces of the photographic plate can be separated readily from each other and an unnecessary one of them can be cancelled, fading and chromatic aberration increase to drop the discernibility as the displacement of the diffraction direction by the hologram from the regular reflection direction of the emulsion layer increases. Further, since the inclination of an image is different from that of regular reflection, a display image is inclined and the angle of visibility is reduced (the image is collapsed in a vertical direction).

FIG. 17 shows a display optical system of a head-up display apparatus (HUD) which employs a non-regular reflection type hologram, and FIG. 18 illustrates movement of the position of a display unit 1 when a virtual image VI is observed by way of a half mirror 4' (which corresponds to a regular reflection type hologram) on the same line of sight.

As can be seen from comparison between FIGS. 17 and 18, when the non-regular reflection type hologram (corresponding to the case of $\theta_1>\theta_2$ in FIG. 16) is used, the virtual image VI is inclined toward the driver comparing with the regular reflection type hologram or half mirror 4'. The reason is substantially illustrated in FIG. 19.

Referring to FIG. 19, a hologram reflection mirror 4 of the non-regular reflection type has interference fringes 4a which are inclined relative to the emulsion or photosensitive agent layer of the hologram 4 (refer also to FIG. 13). Since normally a hologram is designed so that a central portion of a display image may be reproduced at a central portion of the surface of the hologram, when the driver looks into the hologram 4 as seen in FIG. 19, a central portion of an image is observed at or around the center of the surface of the hologram 4. In this instance, it may be considered imaginarily that such a mirror $M_1$ as indicated by a broken line in FIG. 19 is present at or around the center of the hologram 4. It is to be noted here that any influence of a refraction effect of a difference in refraction factor between the hologram emulsion and the external atmosphere is ignored. In this manner, it may be supposed that a central portion of the image is formed from diffracted (reflected) light from the mirror $M_1$ coming to the driver. An upper end $R_2$ of a display image R is diffracted at a portion of the surface of the hologram 4 above the central portion and may be considered to be reproduced as a virtual image $VI_2$ by diffraction (reflection) from another mirror $M_2$. Similarly, a lower end portion $R_3$ of the image R is diffracted below the center of the hologram 4 and is visually discerned as a virtual image $VI_3$ by diffraction from a further mirror $M_3$ by the driver.

Since display light from the display unit 1 is diffracted on the surface of the hologram differently for individual light emitting points in this manner so that the routes of the light coming to the eyes of the driver are different from each other and the imaginary reflection surfaces corresponding to the light emitting points are different from each other, the image is inclined. While the tendency of such inclination of an image is common to non-regular reflection type holograms, the direction of the inclination depends upon the direction of the inclination of the interference fringes with respect to the emulsion layer, and when the direction of the inclination is opposite, as shown in FIG. 20, to that of FIG. 19 with respect to the vertical direction of the emulsion layer, an upper end portion of the virtual image VI is inclined remotely from the driver. It is to be noted that reference character VI' denotes an imaginary reflection image when an imaginary mirror M' is present at the location of the hologram 2.

In the case of $|\theta_2|>|\theta_1|$ wherein the absolute value $|\theta_2|$ of the reflection angle is greater than the absolute value $|\theta_1|$ of the incidence angle, when a general situation wherein a hologram is mounted on a vehicle is considered, the situation is equivalent to the case wherein the display unit is installed, in the positional relationship of the display unit and the observer (driver) to the combiner, nearer to the observer than that with a hologram of regular reflection. Such positional setting is adopted frequently in order to avoid a hologram from being located in the proximity of the root of the windshield of a vehicle where some structural elements of the vehicle such as an air duct and a wire harness and the display unit interfere with each other. Therefore, such a hologram combiner of the non-regular reflection type as shown in FIG. 17 is in many cases suitable for an optical system for a head-up display apparatus, and in this instance, means to solve the problem that an upper end portion of a virtual image is inclined toward the driver is required.

As a possible countermeasure against the problem, it may be supposed readily that the image VI can be caused to rise by inclining the display unit 1 in the direction indicated by an arrow mark θ in FIG. 19. In this instance, however, the height of the image observed by the driver (the angle of visibility) is reduced as can be seen apparently from FIG. 21 to vary the aspect ratio, resulting in deterioration of the discernibility.

The problem of inclination of a virtual image arises also with a regular reflection type hologram when it constructs a concave mirror.

SUMMARY OF THE INVENTION

It is an object of the present invention to provide a non-regular reflection type holographic mirror which, when is mounted as a reflection plate on a windshield of a vehicle, can reduce the inclination of a display image visually discerned by reflection and a process of manufacturing the non-regular reflection type holographic mirror.

It is another object of the present invention to provide a reflection type display apparatus for a vehicle employing a non-regular reflection type hologram or a regular reflection type hologram constituting a concave mirror as a hologram combiner wherein a virtual image of a display unit is reversed into an erect image and compensated for in contraction to improve the discernibility.

In order to attain the objects described above, according to an aspect of the present invention, there is provided a holographic mirror of the non-regular reflection type, which comprises a hologram plate including a transparent support member, and a photosensitive agent layer formed on the transparent support member and having interference fringes formed therein such that the hologram plate has a function of a concave mirror and another function of a convex mirror at one and the other of a pair of portions thereof on the opposite sides of a center line thereof.

The holographic mirror of the non-regular reflection type is suitably employed in a display apparatus for a vehicle. In particular, the holographic mirror is mounted on a windshield of a vehicle such that the portion thereof having a function of a concave mirror is positioned upwardly while the other portion thereof having a function of a convex mirror is positioned downwardly, and a display unit is disposed below the windshield with a display surface thereof directed upwardly. A virtual image formed from that of light emitted from the display surface of the display unit which is reflected by the portion of the holographic mirror having a function of a concave mirror is displayed at a distance longer than a substantial distance between the display surface and the holographic mirror, but another virtual image formed from that of the light which is reflected by the other portion of the holographic mirror having a function of a convex mirror is displayed at another distance smaller than the substantial distance between the display surface and the holographic mirror. Consequently, the forward inclination of the display image which is visually discerned as a virtual image is reduced. Accordingly, such a good image as is obtained using a regular reflection mirror can be visually discerned while assuring the degree of freedom in designing the location of the display unit.

According to another aspect of the present invention, the holographic mirror of the non-regular reflection type is produced by a method which comprises the steps of applying a photosensitive agent to a surface of a transparent support member to form a hologram plate, and irradiating, at different incidence angles upon the opposite faces of the hologram plate, divergence light of a wavelength from a pair of divergence points spaced by an equal distance from the center of the hologram plate to record interference fringes in the photosensitive agent layer on the hologram plate such that the hologram plate has a function of a concave mirror and another function of a convex mirror at one and the other of a pair of portions thereof on the opposite sides of a center line.

According to a further aspect of the present invention, there is provided a holographic mirror of the non-regular reflection type, which comprises a hologram plate including a transparent support member, and a photosensitive agent layer formed on the transparent support member and having interference fringes formed therein such that the hologram plate has a function of a concave mirror the magnification of which increases at one of a pair of portions of the hologram plate on the opposite sides of a center line but decreases at the other portion of the hologram plate.

Also with the holographic mirror of the non-regular reflection type, when it is incorporated in a display apparatus for a vehicle, similar effects to those of the first-mentioned holographic mirror of the non-regular reflection type according to the present invention can be attained.

According to a still further aspect of the present invention, the holographic mirror of the non-regular reflection type is produced by a method which comprises the steps of applying a photosensitive agent to a surface of a transparent support member to form a hologram plate, and irradiating, at different incidence angles upon the opposite faces of the hologram plate, divergence light of a wavelength as object light and reference light from a pair of divergence points spaced from the center of the hologram plate by different distances with the distance to the divergence point for the object light set greater than the distance to the other divergence point for the reference light to record interference fringes in the photosensitive agent layer on the hologram plate such that the hologram plate has a function of a concave mirror the magnification of which increases at one of a pair of portions of the hologram plate on the opposite sides of a center line but decreases at the other portion of the hologram plate.

According to a yet further aspect of the present invention, there is provided a display apparatus of the reflection type for a vehicle, which comprises a display unit, a combiner formed from a hologram of the non-regular reflection type for reflecting display light from the display unit toward a driver of the vehicle so as to allow the driver to visually observe the reflected display light as a virtual image of the display image of the display unit, and a prism interposed in an optical path between the display unit and the combiner for inclining and elongating the virtual image of the display image of the display unit in one direction with respect to the display image. Preferably, the hologram of the non-regular reflection type has an incidence angle of the display light of the display unit which has an absolute value lower than the absolute value of a reflection angle of the display light from the hologram of the non-regular reflection type.

According to a yet further aspect of the present invention, there is provided a display apparatus of the reflection type for a vehicle, which comprises a display unit, a combiner formed from a hologram of the regular reflection type constituting a concave mirror for reflecting display light from the display unit toward a driver of the vehicle so as to allow the driver to visually observe the reflected display light as a virtual image of the display image of the display unit, and a prism interposed in an optical path between the display unit and the combiner for inclining and elongating the virtual image of the display image of the display unit in one direction with respect to the display image.

With both of the display apparatus of the reflection type for a vehicle, since the prism interposed in the optical path between the display unit and the combiner inclines and elongates the virtual image of the display image of the display unit in the one direction with respect to the display image, the virtual image of the display image, which is otherwise inclined or collapsed when the prism is absent, is reversed into an erect image and elongated in the one direction. Consequently, improved discernibility is obtained.

Where the hologram of the non-regular reflection type has an incidence angle of the display light of the display unit which has an absolute value lower than the absolute value of a reflection angle of the hologram of the non-regular reflection type, the display unit can be located nearer to the driver of the vehicle, which is advantageous in space for location of the display unit.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a diagrammatic view illustrating a method of producing a non-regular reflection type holographic mirror according to the present invention;

DESCRIPTION OF THE PREFERRED EMBODIMENTS

Figure 2A:
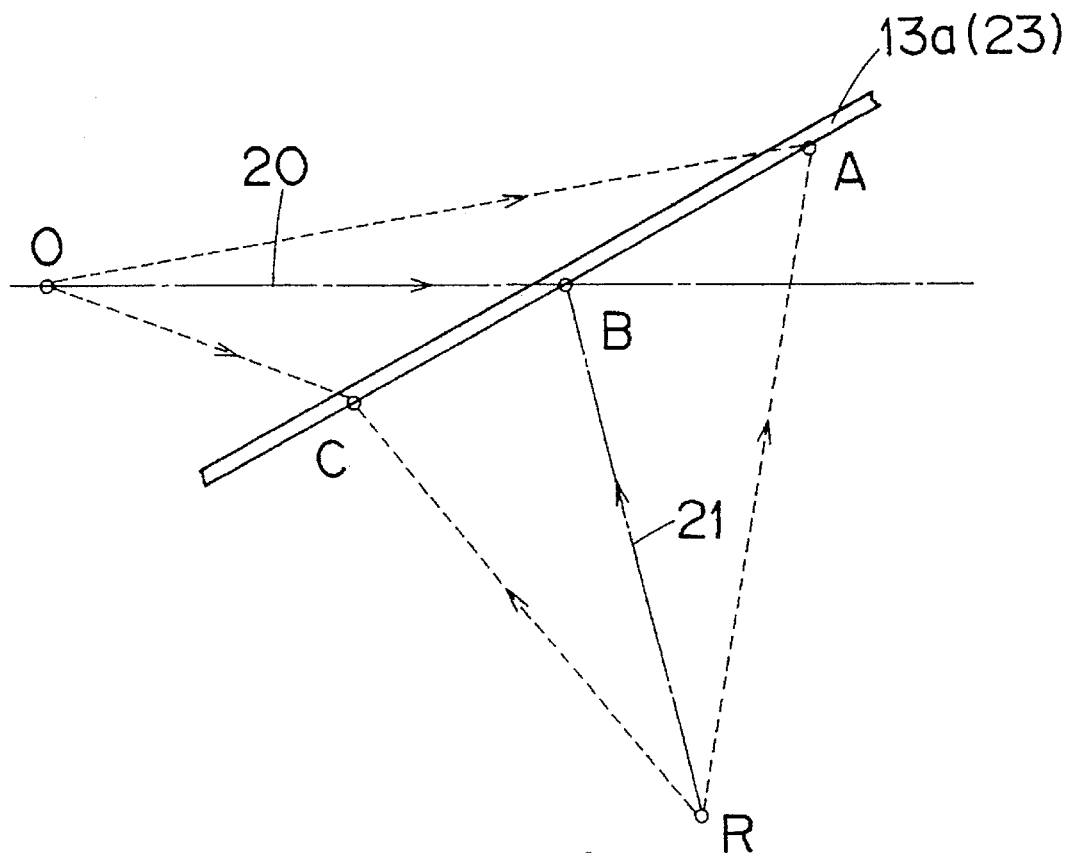
FIG. 2a is a diagrammatic view illustrating a method of forming a portion functioning as a concave mirror and another portion functioning as a convex mirror on an upper half side and a lower half side, respectively, of a hologram with respect to a substantially center line in the producing method of FIG. 1.

Referring first to FIG. 1, there is illustrated a method of producing a non-regular reflection type holographic mirror to which the present invention is applied. Divergence light is used for both of object light 20 and reference light 21 which are used for recording of a hologram. Since basically a plane mirror is produced, divergence points O and R of the object light 20 and the reference light 21 are spaced substantially by an equal distance from a center B of a hologram plate 13a as seen from FIG. 2a while the object light 20 and the reference light 21 are introduced to the opposite surfaces of the hologram plate 13a at different incidence angles. Accordingly, a hologram 23 thus produced presents, at the point B, a function of a plane mirror having a magnification equal to 1, but presents, at another point A which is spaced by a greater distance from the divergence point O than from the divergence point R, that is, OA>RA, a function of a concave mirror having a magnification higher than 1 with respect to the divergence point R. On the other hand, the hologram 23 presents, at a further point C which is spaced by a smaller distance from the divergence point O than from the divergence point R, a function of a convex mirror having a magnification lower than 1 with respect to the divergence point R.

Figure 14:
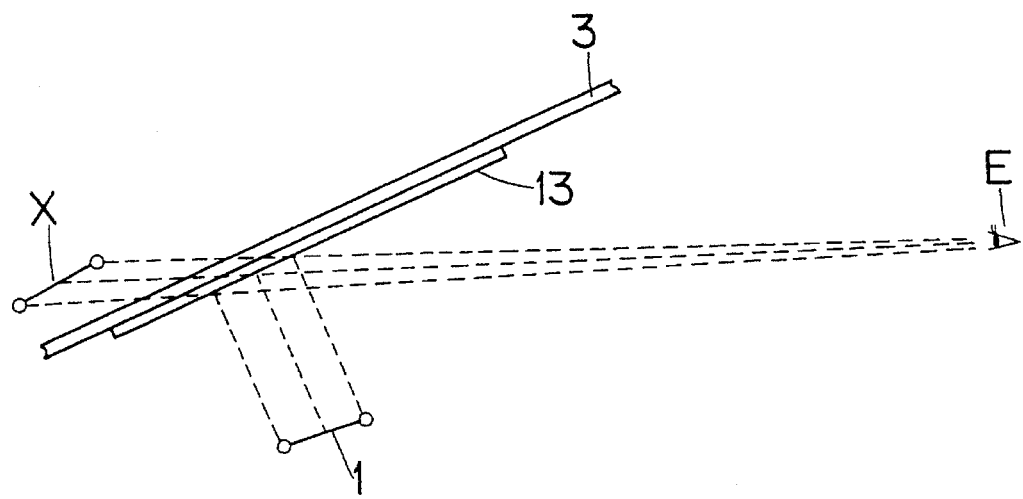
FIG. 14 is a diagrammatic view illustrating an image forming condition when a conventional non-regular reflection type holographic mirror is mounted on a windshield of a vehicle.
Figure 15:
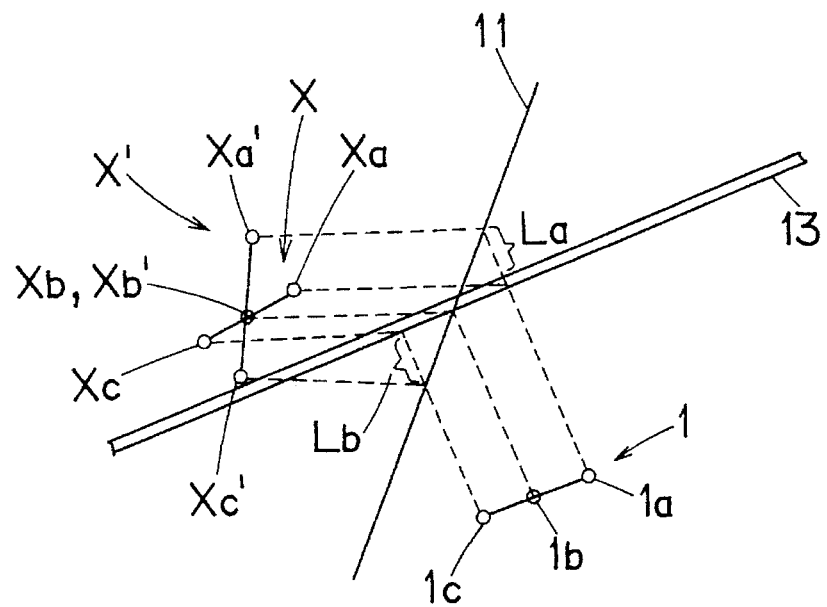
FIG. 15 is a diagrammatic view illustrating a disadvantage when a conventional non-regular reflection type holographic mirror is mounted on a windshield of a vehicle.
Figure 16:
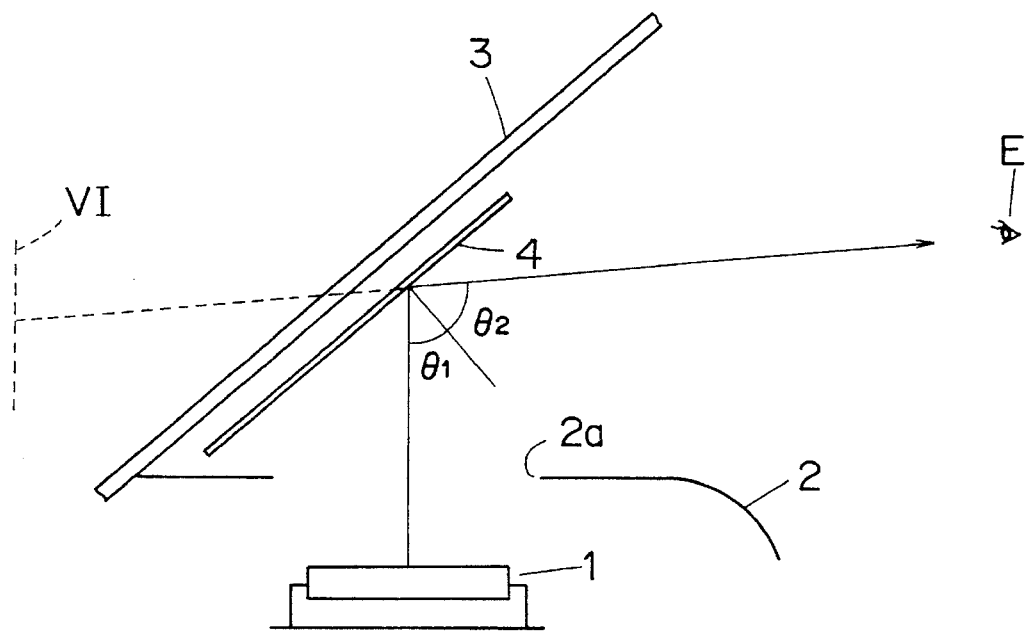
FIG. 16 is a diagrammatic view showing a conventional reflection type display apparatus for a vehicle wherein a reflection type hologram is employed as a combiner.
Figure 17:
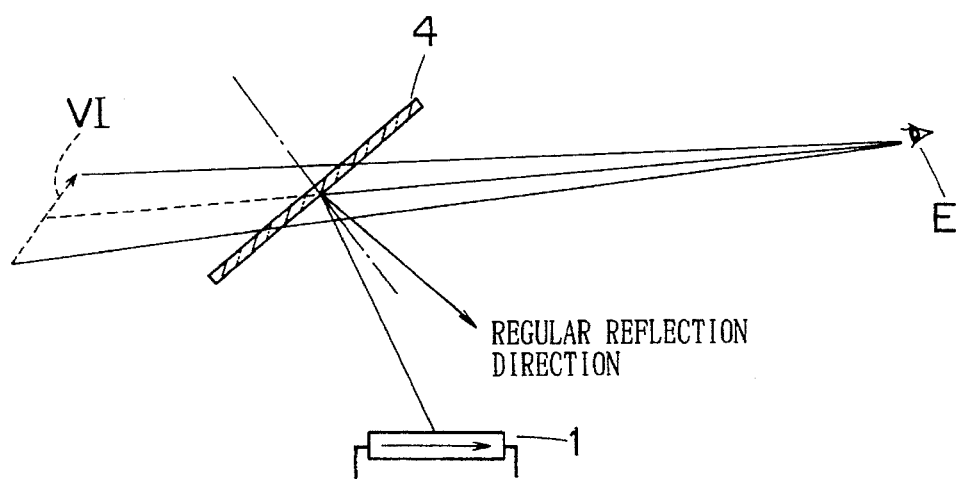
FIG. 17 is a diagrammatic view illustrating a disadvantage of a reflection type display apparatus wherein a non-regular reflection type hologram is employed as a combiner.
Figure 18:
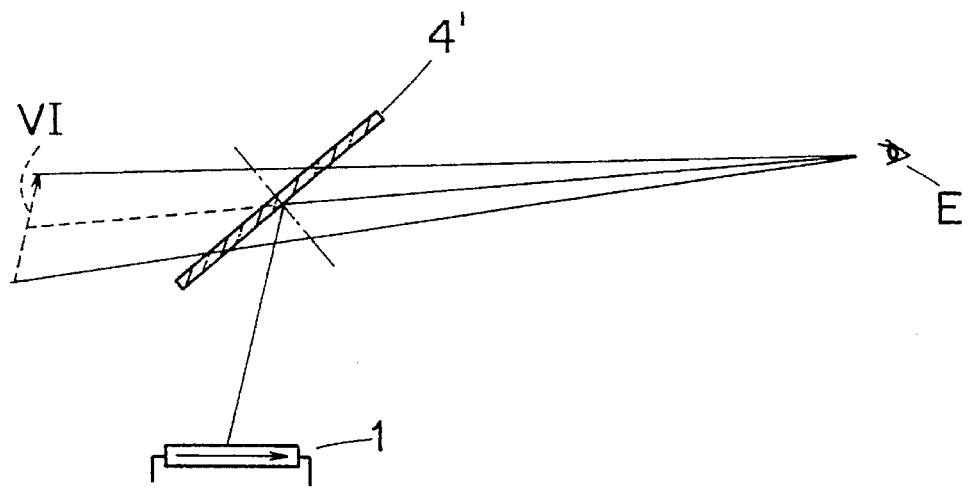
FIG. 18 is a diagrammatic view illustrating a regular reflection type display apparatus for comparison with the apparatus of FIG. 17.
Figure 19:
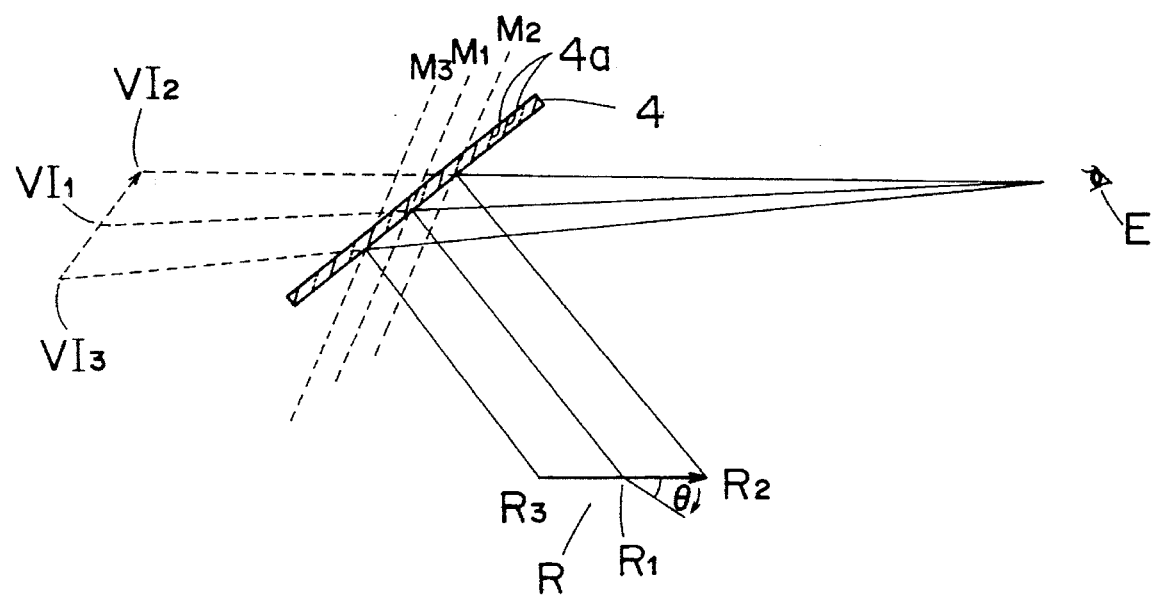
FIG. 19 is a diagrammatic view illustrating a reason why the disadvantage of the reflection type display apparatus of FIG. 17 arises.
Figure 20:
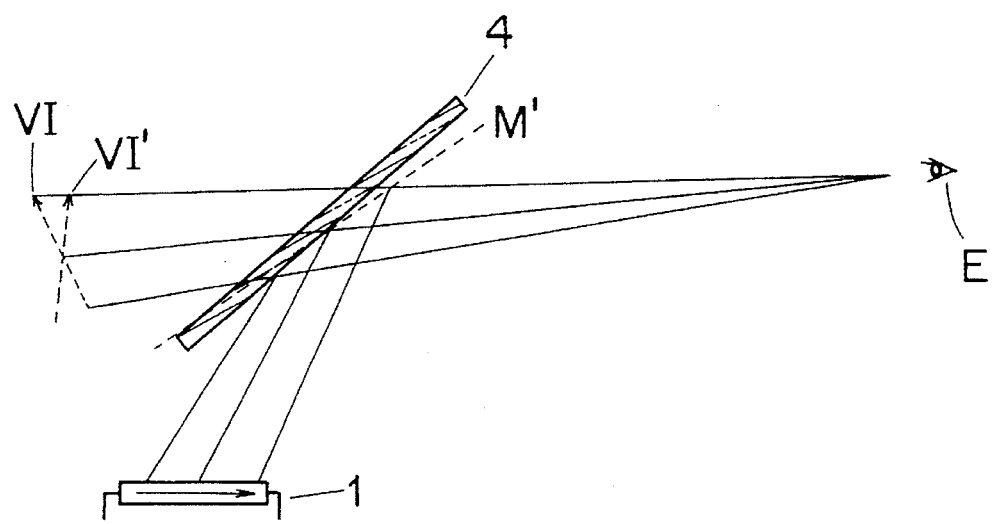
FIG. 20 is a diagrammatic view illustrating another conventional non-regular reflection type hologram.
Figure 21:
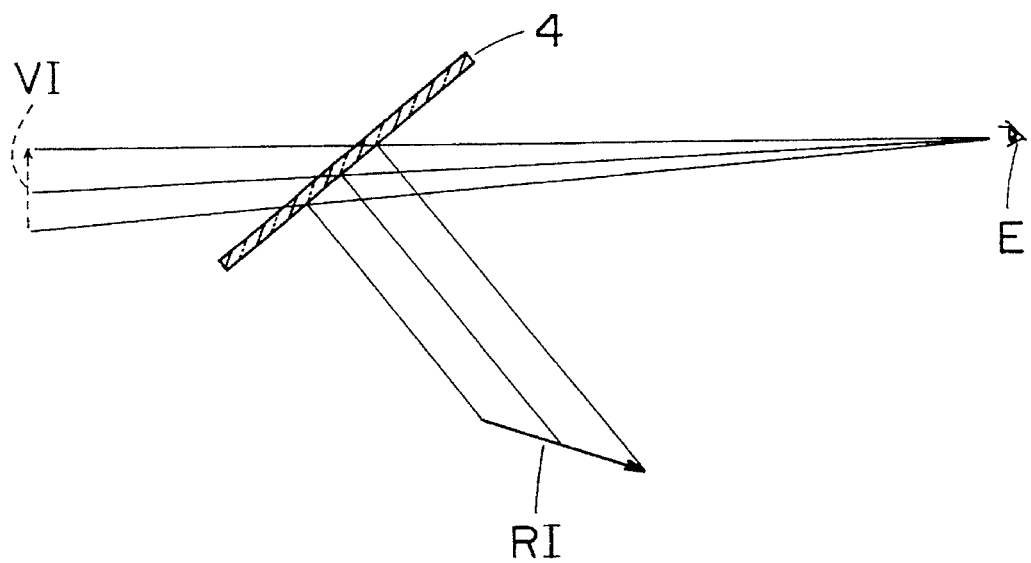
FIG. 21 is a diagrammatic view illustrating another problem which arises when the inclination of an image is eliminated.

The hologram 23 recorded in this manner has a function of a plane mirror at the center B thereof and has an expanding function toward the point A but on the contrary has a reducing function toward the point C. If the hologram 23 is mounted on a windshield 3 of a vehicle as shown in FIG. 14 so that it is used as a combiner, then a virtual image formed by light emitted from a display surface of a display unit 1 and reflected to form an image by the portion of the hologram 23 having the function of a concave mirror is displayed at a position farther than a substantial distance between the display surface of the display unit 1 and the holographic mirror, but on the contrary, another virtual image reflected to form an image by the other portion of the hologram 23 having the function of a convex mirror is displayed at another position nearer than the substantial distance between the display surface of the display unit 1 and the holographic mirror. As a result, the display image visually discerned as a virtual image when observed from the point E of view of a driver does not present a forwardly inclined condition as compared with a display image obtained with another hologram obtained by recording with object light and reference light which are both parallel light, and consequently, the virtual image is equivalent to a display image visually discerned with a regular reflection mirror.

Subsequently, another method of producing another non-regular reflection type holographic mirror to which the present invention is applied will be described.

Figure 2B:
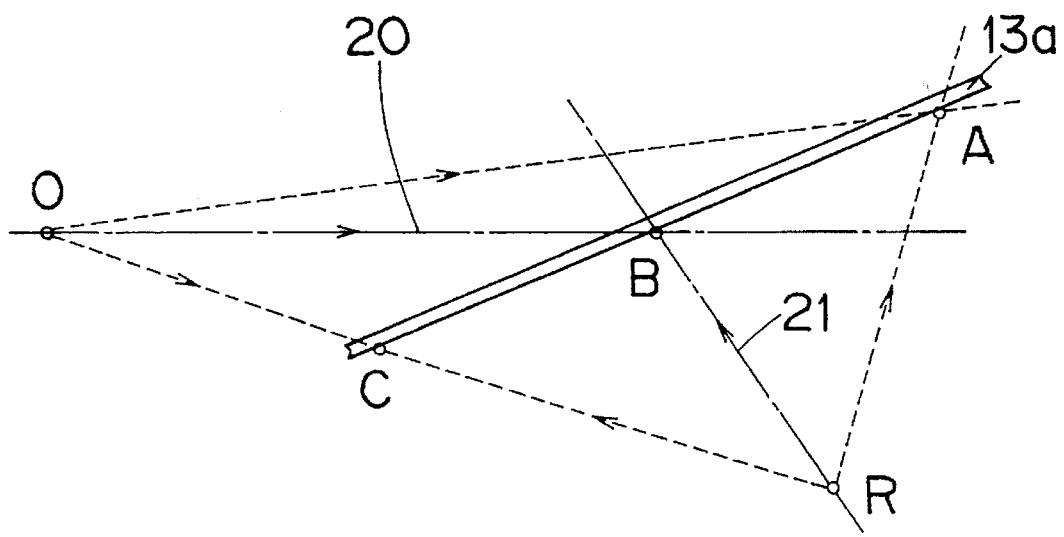
FIG. 2b is a similar view but illustrating a method of forming a portion at which the magnification increases and another portion at which the magnification decreases on an Upper half side and a lower half side, respectively, of a hologram with respect to a substantially center line in the producing method of FIG. 1.

FIG. 2b illustrates the second method of producing the second non-regular holographic mirror. In order to produce a hologram, a similar producing process as described above with reference to FIG. 1 is used while using divergence light for both of object light 20 and reference light 21 for recording of a hologram. In this instance, the optical distances OB and RB from divergence points O and R of the object light 20 and the reference light 21 substantially to a center B of a hologram plate 13a is set to OB>RB as shown in FIG. 2b. Consequently, a non-regular reflection type holographic mirror having a power (magnification) is obtained. If, for example, OB/RB=2 and the incidence angles RBC and OBC of the reference light 21 and the object light 20 to the plane of the hologram plate have the relationship of RBC>OBC, then OA/RA>2 and OC/RC<2, and consequently, the magnification increases from the reference magnification provided at the point B toward the point A side, but decreases reversely from the reference magnification toward the point C side.

Figure 11:
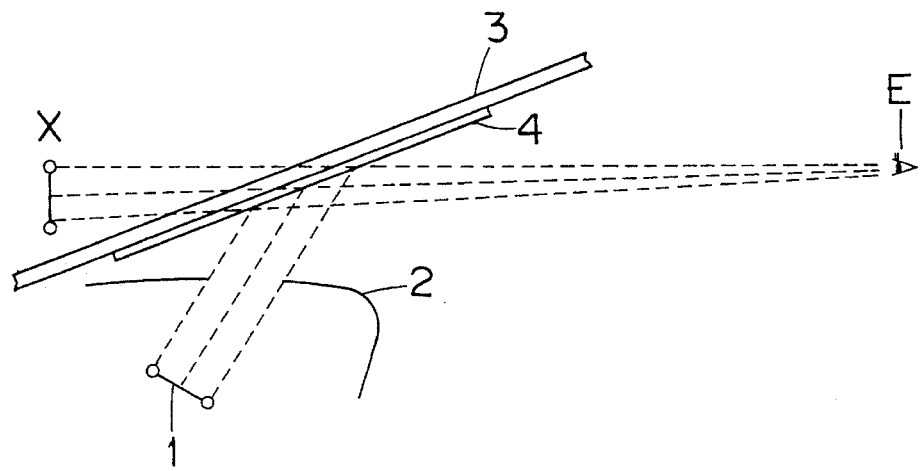
FIG. 11 is a conventional head-up display apparatus wherein a windshield of a vehicle is used as a reflection plate.
Figure 12:
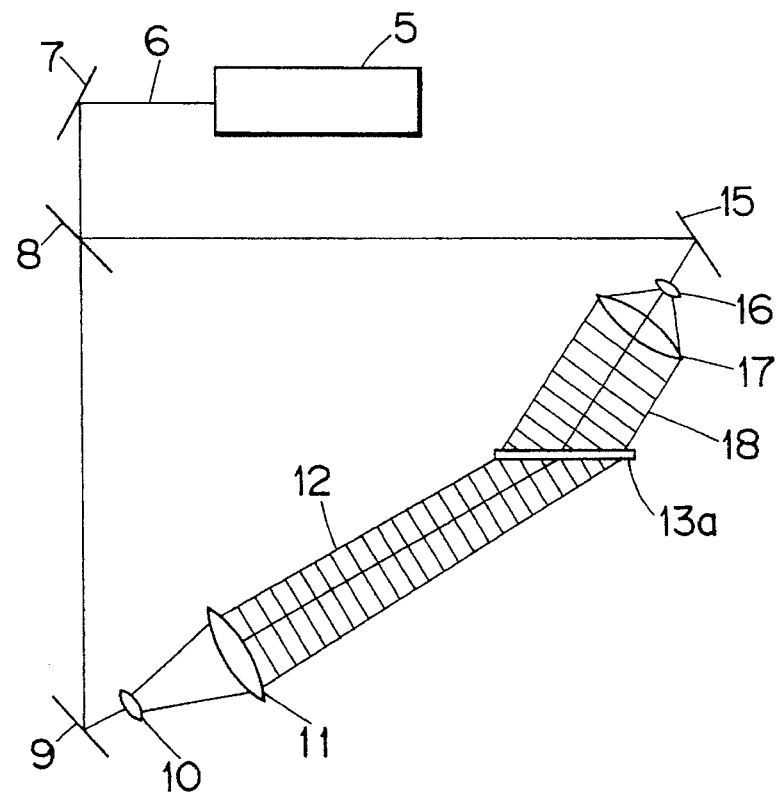
FIG. 12 is a diagrammatic view illustrating a conventional method of producing a non-regular reflection type holographic mirror.
Figure 13:
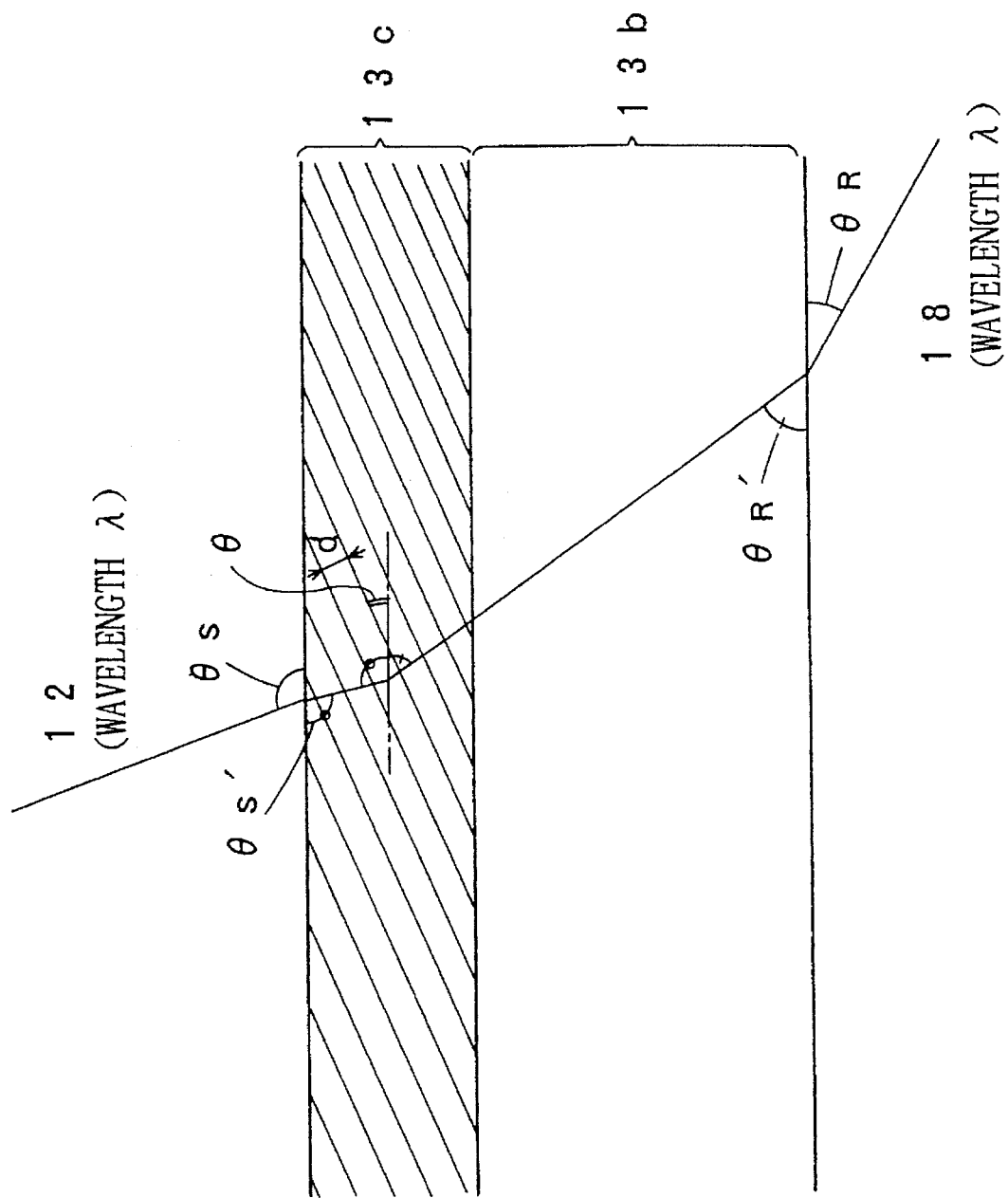
FIG. 13 is a diagrammatic sectional view illustrating a condition of interference fringes recorded on a hologram.

Accordingly, if the hologram 23 is mounted on a windshield 3 in FIG. 11 so that it is used as a combiner similarly to the hologram 23 of the preceding embodiment, then a display image visually discerned as a virtual image when observed from the point E view of a driver does not present a forwardly inclined condition as compared with a display image obtained with another hologram obtained by recording with object light and reference light which are both parallel light, and as a result, the virtual image is equivalent to a display image visually discerned with a regular reflection mirror.

The rate at which the magnification is provided with reference to the substantial center of the hologram 23, that is, the rate at which the magnification increases in one direction but decreases in the other direction, depends upon the degree of non-regular reflection, and as the degree of non-regular reflection increases, the power must be increased. While the divergence points O and R may basically be set to any points, in order for a hologram to have such a power with a small area, the divergence points O and R of laser beams upon recording should effectively be set as nearer to the hologram plate 13a as possible. It is to be noted that, since the hologram 23 has a magnification which varies as different locations thereof, the display surface of the display unit itself may require some correction.

Figure 3:
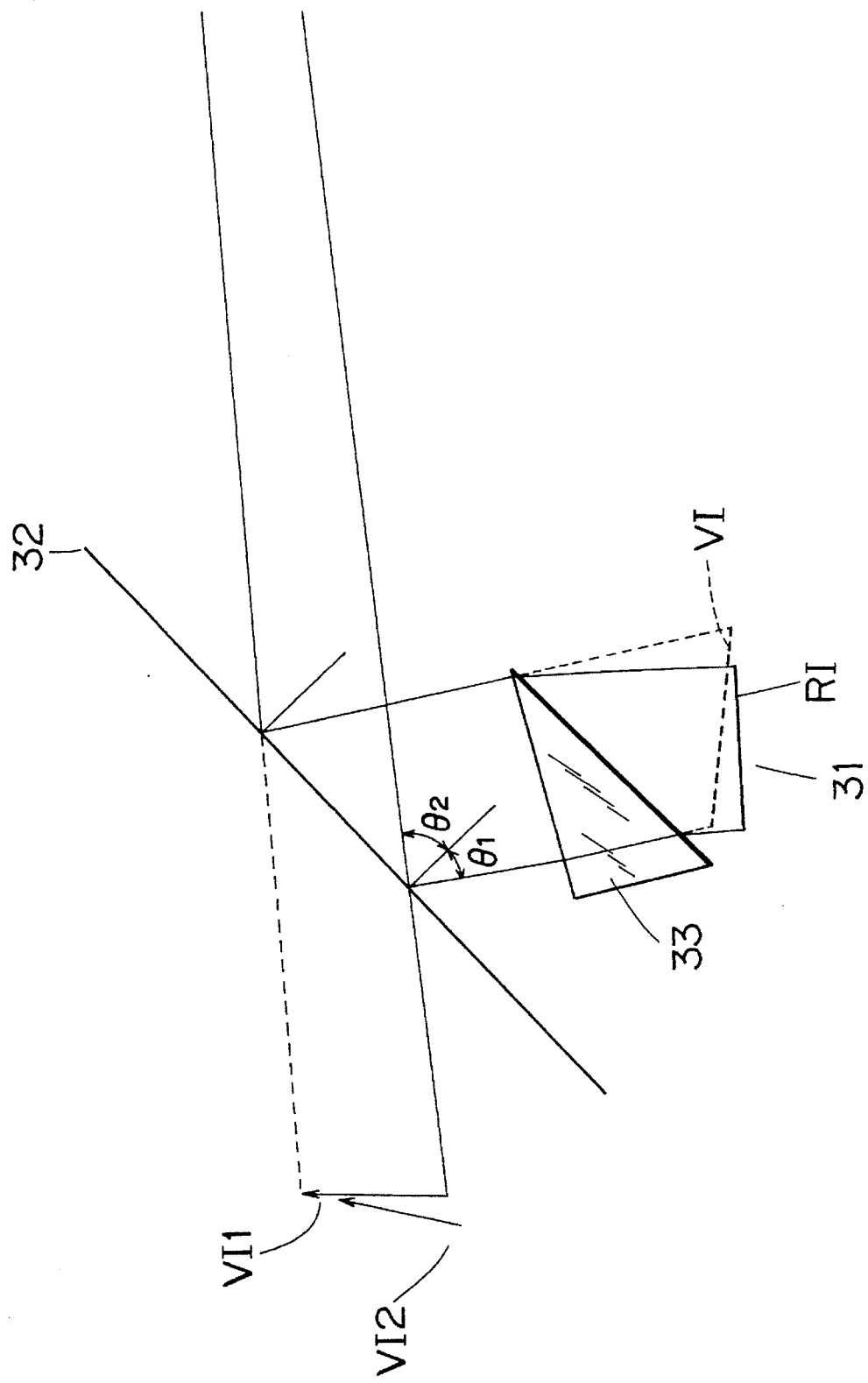
FIG. 3 is a diagrammatic view showing a reflection type display apparatus for a vehicle to which the present invention is applied.

Referring now to FIG. 3, there is shown an optical system of a reflection type display apparatus for a vehicle to which the present invention is applied. The reflection type display apparatus shown includes a display unit 31, a hologram combiner 32 for diffracting display light from a display image RI of the display unit 31 toward a point of view of a driver so as to allow a virtual image VI1 to be visually discerned by the driver, and a prism 33 interposed in an optical path between the display unit 31 and the combiner 32. The hologram combiner 32 is constituted from a non-regular reflection type hologram wherein the absolute value $|\theta_1|$ of an incidence angle $\theta_1$ of display light of the display unit 31 is smaller than the absolute value $|\theta_2|$ reflection angle $\theta_2$.

When the driver looks into the display unit 31 from the combiner side 32 by way of the prism 33, a virtual image VI of the display image RI of the display unit 31 looks such that it is inclined and elongated vertically. Accordingly, also when the driver visually observes the virtual image by way of the combiner 32, it observes the diffraction image VI1 of the image VI to which an inclination and an elongation are applied by the prism 33.

Particularly where the combiner 32 is a non-regular reflection type hologram wherein $\theta_1 \neq \theta_2$ as shown in FIG. 3, a virtual image VI2 which is a diffraction image observed by the driver without the prism 33 is an unfamiliar image to the driver in that an upper portion thereof is inclined toward the driver side, but actually since the image is inclined by the prism 33, the display image erects regularly and provides no unfamiliar feeling. Further, in this instance, while the substantial height of the image is reduced by the inclination of the image, such reduction is compensated for by elongation of the image by the prism 33. Consequently, also the final virtual image VI1 is a good image not reduced in angle of view comparing with that when no prism is present.

It will be investigated below how the image RI of the display unit 31 is converted into the virtual image VI by the prism 33 and how to design an optimum positional relationship between the prism 33 and the display unit 31.

Figure 7:
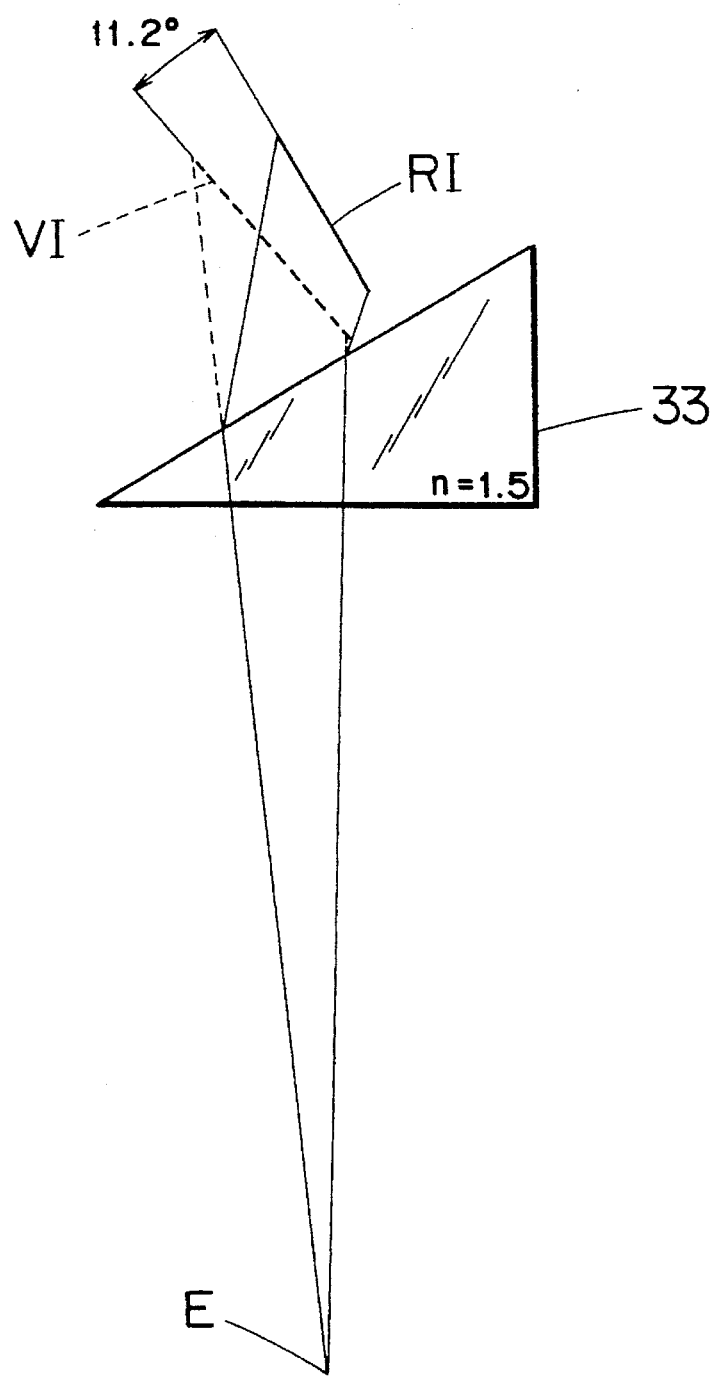
Figure 8:
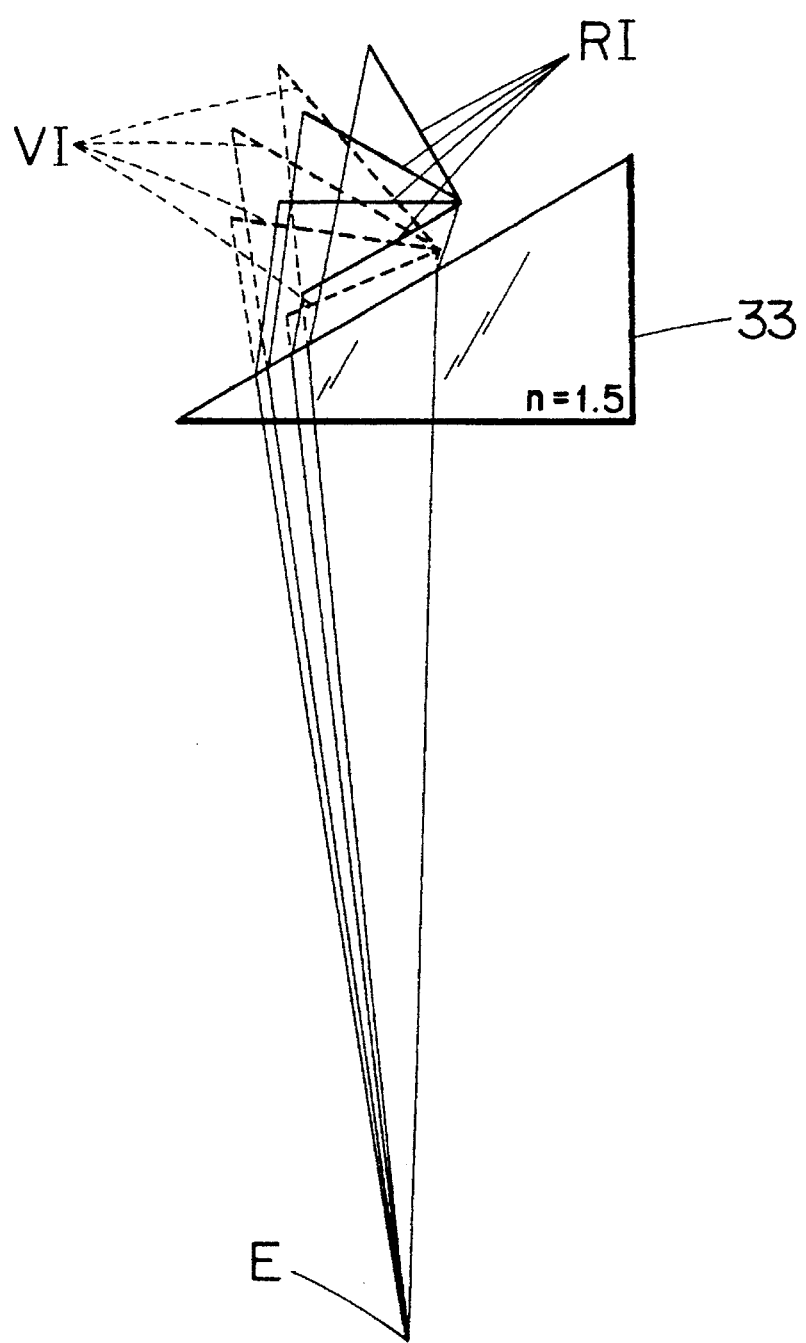
FIG. 8 is a diagrammatic view showing the display unit and the virtual images shown in FIGS. 4 to 7.

FIGS. 4 to 7 illustrate different stages of a variation of in what manner the virtual image VI looks when the prism 33 is disposed in front Of the display unit 31 and the virtual image VI is observed while the image RI of the display unit 31 is rotated around the right end thereof, and FIG. 8 shows them collectively.

Figure 4:
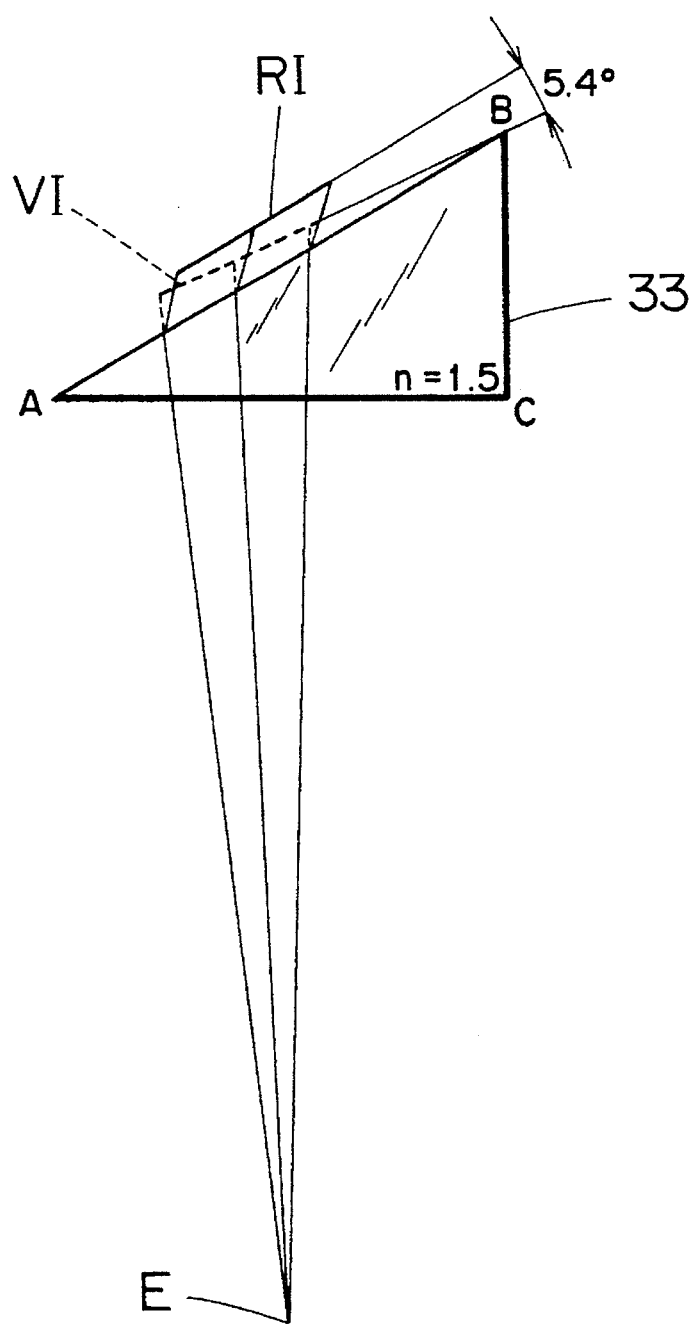
FIG. 4 is a diagrammatic view showing a virtual image of a display unit of the reflection type display apparatus of FIG. 3 when observed by way of a prism.
Figure 5:
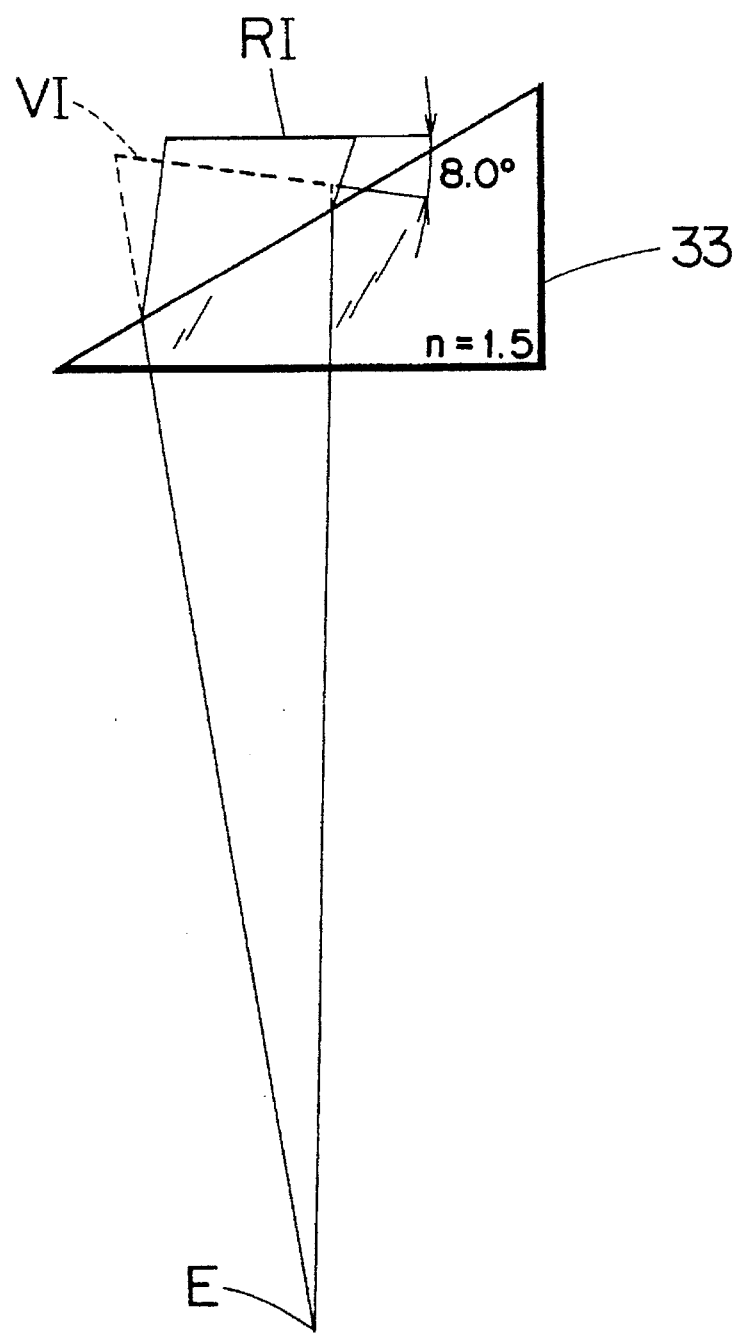
FIGS. 5 to 7 are diagrammatic views illustrating a variation of the virtual image of FIG. 4 when the display unit is rotated successively in FIG. 4.
Figure 6:
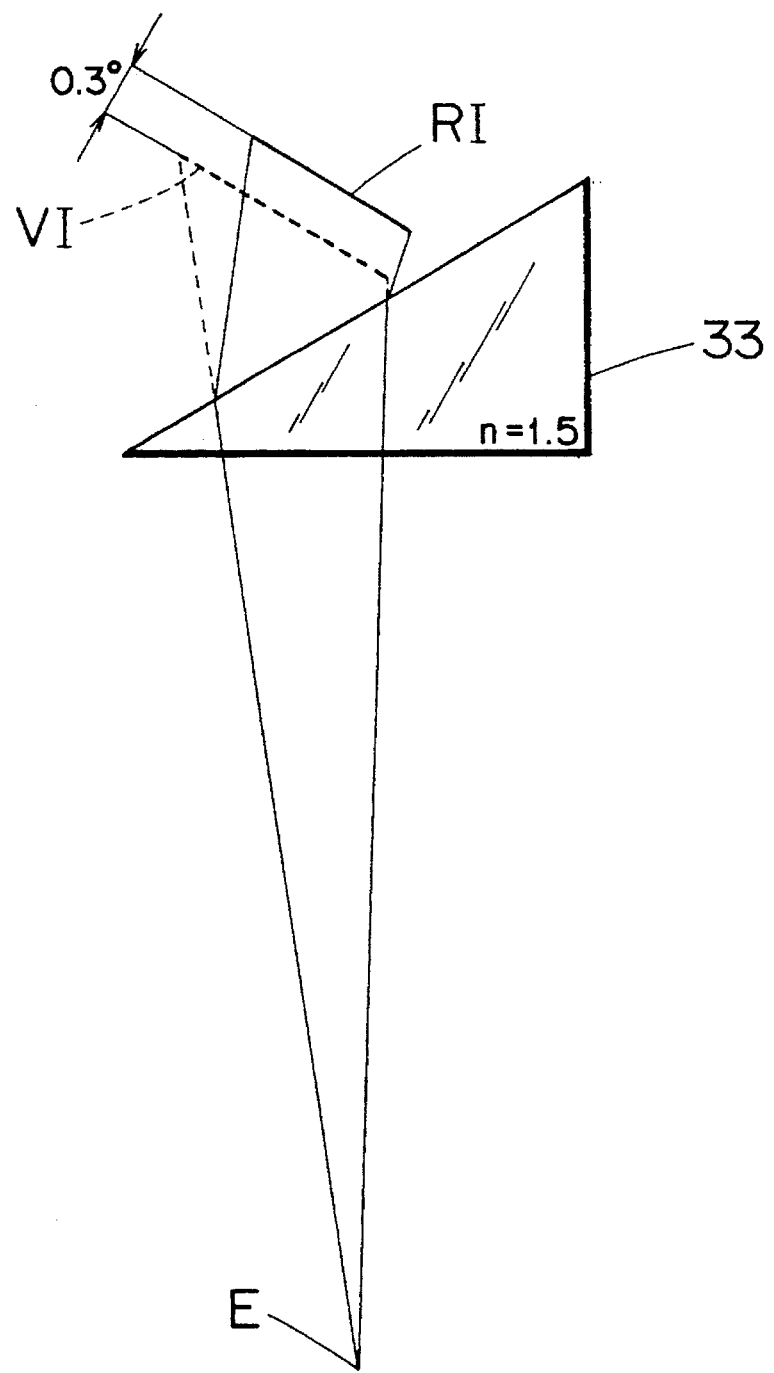

As can be seen from FIG. 4, when the image RI lies in parallel to the side AB of the prism 33, the virtual image VI is inclined toward the image RI side at the left end thereof and is reduced in length. However, the angle of view from the point E of view does not vary significantly as can be seen also from the positional relationship in FIG. 4. If the virtual image VI is rotated from the position in a direction in which the left end thereof is spaced away from the prism 33, then the inclination angle increases and the length of the virtual image increases, and also the angle of view increases. However, each of the inclination angle and the angle of view changes to a decreasing tendency at a certain point, and finally, the direction of the inclination is reversed. Accordingly, it is insufficient to merely install the prism 33, but an optimum positional relationship must exist.

Figure 9:
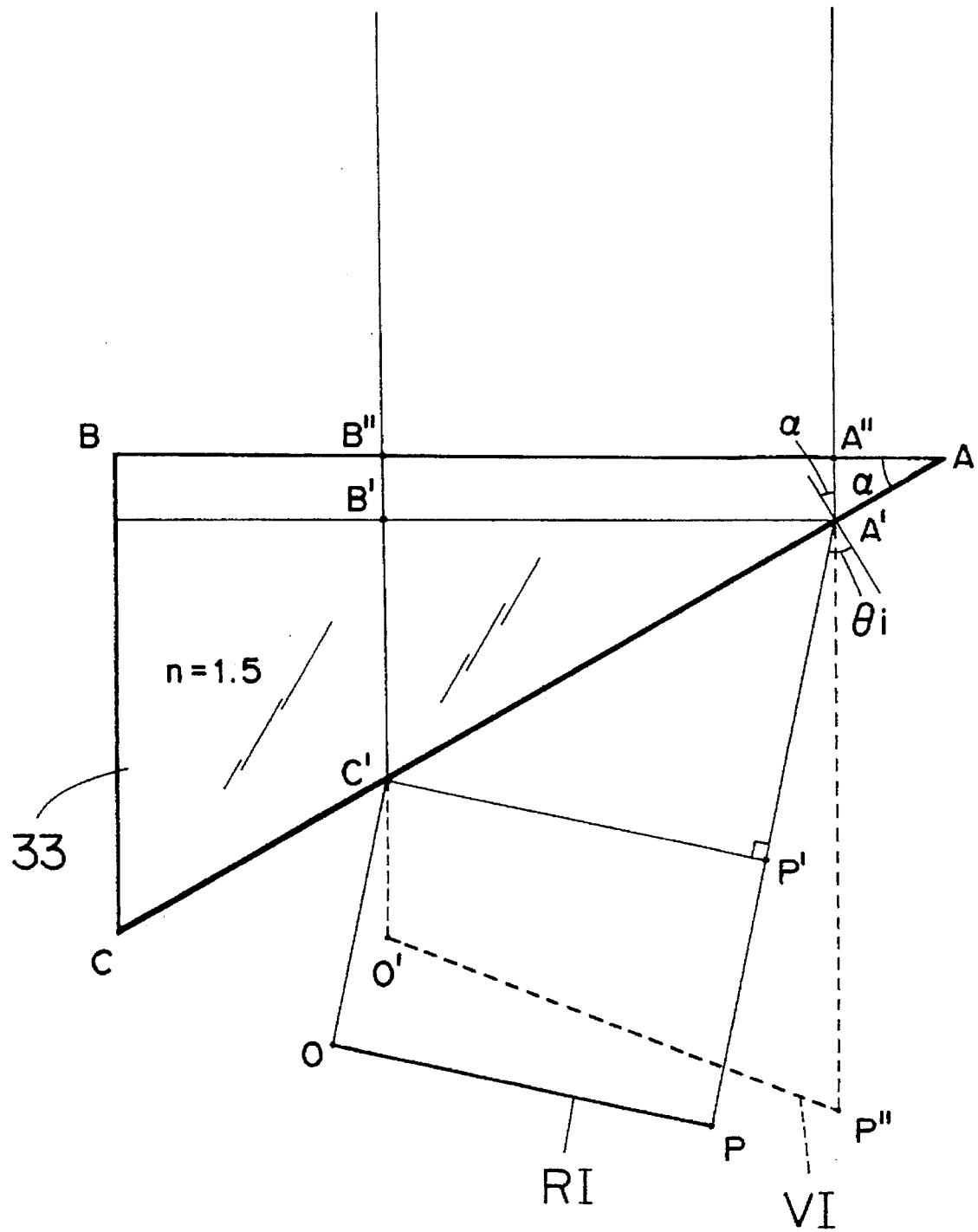
FIG. 9 is a diagrammatic view illustrating the prism and the display unit of FIG. 4 but in a simplified representation.

FIG. 9 illustrates a further analysis to this point. Referring to FIG. 9, the following simplification is applied in order to facilitate the analysis. In particular, it is assumed that a real image of the display unit is observed from a sufficiently remote location on a normal line to the face of the prism 33 opposing to the driver. In this instance, rays of light from different points of the real image are, after they pass through the prism 33 and come to the driver, substantially parallel to each other and substantially perpendicular to the emerging face of the prism 33. Meanwhile, the incidence angle $\theta 1$ of rays of light which are introduced from different points of the display unit 31 into the prism 33 and come to the observer is calculated from the apex angle $\alpha$ of the prism 33 and the refraction factor n of the prism 33 by the following equation $$\sin \theta_1 = n \sin \alpha$$

Further, since the image RI (OP) of the display unit in FIG. 7 is perpendicular to the ray PA' of light, the angle of field of the virtual image O'P" observed by the observer is at the greatest value and also the range utilized by the prism 33 is at the widest. This range is A'A"B"C' of the prism in FIG. 7. It is first understood that the outside of the range is unnecessary. Subsequently, those of the rays of light passing through the prism 33 which belong to the range A'A"B"B' are excepted since there is no influence upon the inclination of the virtual image even if they are excepted. Accordingly, a prism only of the portion A'B'C' is considered. Further, even if OP is parallelly moved to C'P', since the optical path is decreased by an equal amount at any point on OP, it does not have an influence upon a final inclination of the virtual image either.

Figure 10:
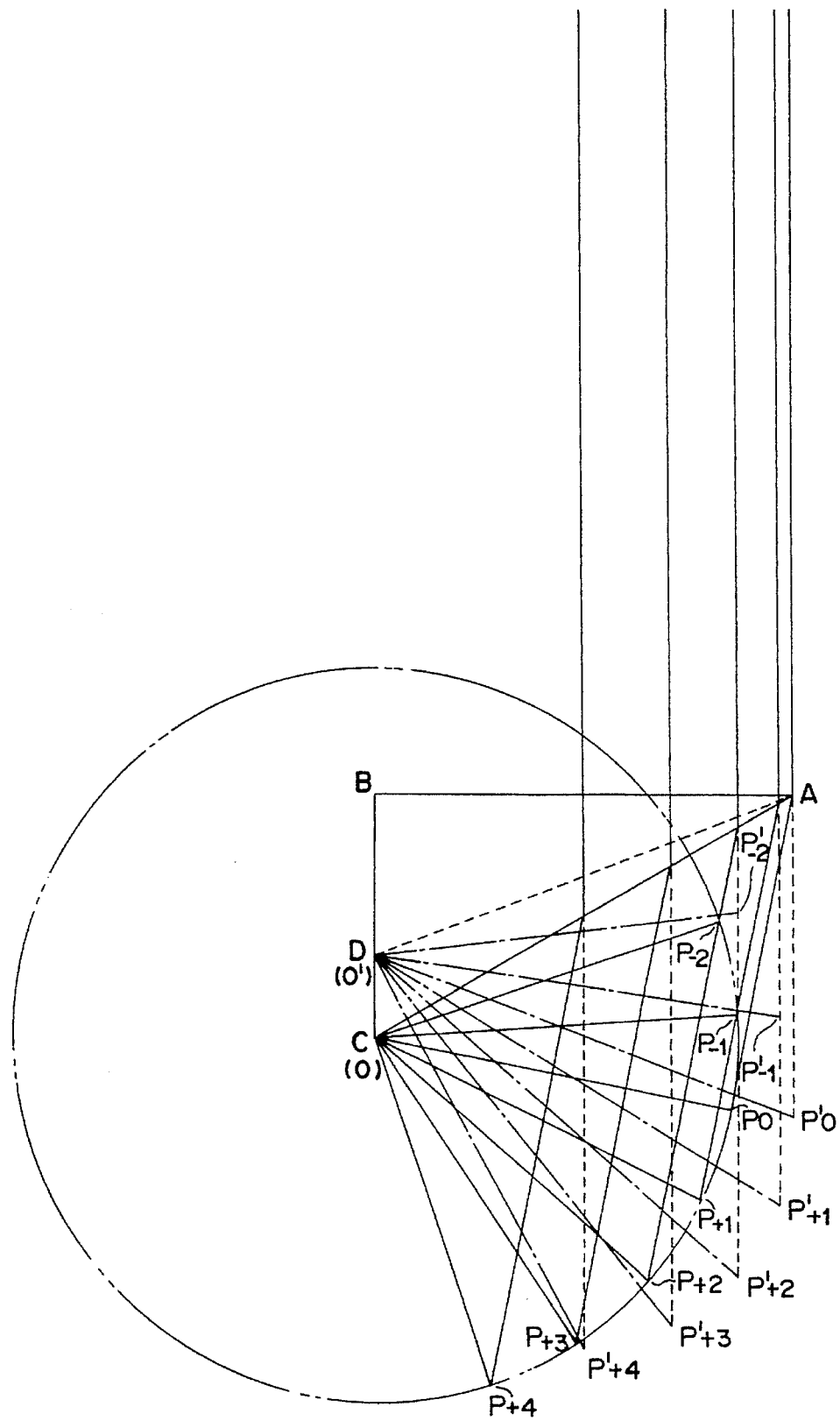
FIG. 10 is a diagrammatic view illustrating the relationship between the display unit and the inclination angle of the virtual image in the display apparatus of FIG. 3.

A view produced after such simplification is shown in FIG. 10. Referring to FIG. 10, a virtual image O' of an end point O of an image extending to the apex C of the prism shown always appears at a point D. Meanwhile, the other end point P moves on an arc indicated by an alternate long and two short dashes line in FIG. 8. In this instance, the angle of field of a virtual image O'P' of an image OP can be taken at the largest when the image OP is at $OP_0$ at which it extends perpendicularly to rays of light as described above. This always stands even without setting the point of view to a sufficiently remote location and is an important guideline to designing of the positional relationship between the prism 33 and the image of the display unit.

Meanwhile, the inclination angle of the virtual image relative to the image is in a much complicated relation, and the inclination angle or the optimum value of the same varies to various values depending upon the position of the point of view, the apex angle of the prism and the installation location of the image. Incidentally, in the case of FIG. 10, the relative inclination angle exhibits a maximum value at a position where the point P is nearer to the prism 33 than the position of $OP_0$ at which the image OP lies perpendicularly to the rays of light, and thus almost at or around OP-1.

Thus, if importance is attached to the angle of field of the virtual image observed by the driver, the positional relationship between the prism 33 and the image OP of the display unit should be such a relationship that the image OP and the rays of light (principal rays passing the pupils where the point of view is so near that the pupils of the driver must necessarily be taken into consideration) may cross perpendicularly to each other. On the other hand, if it is desired to take a maximum inclination of the image, the position of OP at which the inclination is at the maximum must be searched for while fixing the end point O for each set condition.

However, where the apex angle A of the prism ranges from 15° to 60° or so at which it has a substantial significance, if the angle of field is set to a maximum value, then a substantially maximum value of the inclination angle is obtained, and accordingly, this method should be adopted as a guideline to designing.

It is to be noted that, while a non-regular reflection type hologram is employed for the combiner in the embodiment described above, the present invention can be applied generally to any reflection type display apparatus wherein a virtual image is formed in an inclined posture by way of a combiner formed from a reflection type hologram. Thus, by interposing a prism between the display unit and the combiner, any inclination of a virtual image which is caused by an alternative combiner, which is formed, for example, from a regular reflection type hologram constituting a concave mirror, can be eliminated.

Having now fully described the invention, it will be apparent to one of ordinary skill in the art that many changes and modifications can be made thereto without departing from the spirit and scope of the invention as set forth herein.

What is claimed is:

1. A holographic mirror of the non-regular reflection type, comprising;

a hologram plate including a transparent support member, and a photosensitive agent layer formed on said transparent support member and having interference fringes formed therein such that said hologram plate has a function of a concave mirror at a first portion of said hologram plate and another function of a convex mirror at a second portion of said hologram plate on opposite sides of a horizontal center line thereof.

2. A display apparatus of the reflection type for a vehicle, comprising:

a display unit; and a combiner formed from a hologram of the non-regular reflection type for reflecting display light from said display unit toward a driver of said vehicle so as to allow the driver to visually observe the reflected display light as a virtual image of the display image of said display unit;

said hologram including a transparent support member, and a photosensitive agent layer formed on said transparent support member and having interference fringes formed therein such that said hologram plate has a function of a concave mirror at a first portion of said hologram plate and another function of a convex mirror at a second portion of said hologram plate on opposite sides of a horizontal center line thereof.

3. A display apparatus of the reflection type for a vehicle as claimed in claim 2, wherein said hologram plate is mounted on said vehicle such that the upper and lower portions thereof on the opposite sides of the horizontal center line have functions of a concave mirror and a convex mirror, respectively.

4. A method of producing a holographic mirror of the non-regular reflection type, comprising the steps of:

applying a photosensitive agent to a surface of a transparent support member to form a hologram plate; and irradiating, at different incidence angles upon the opposite faces of the hologram plate, monochromatic light diverging from a pair of divergence points spaced by an equal distance from the center of the hologram plate to record interference fringes in the photosensitive agent layer on the hologram plate such that said hologram plate has a function of a concave mirror at a first portion of said hologram plate and another function of a convex mirror at a second portion of said hologram plate on opposite sides of a horizontal center line.

5. A display apparatus of the reflection type for a vehicle, comprising:

a display unit;

a combiner formed from a hologram of the non-regular reflection type for reflecting display light from said display unit toward a driver of said vehicle so as to allow the driver to visually observe the reflected display light as a virtual image of the display image of said display unit; and a prism interposed in an optical path between said display unit and said combiner for inclining and elongating the virtual image of the display image of said display unit in one direction with respect to the display image.

6. A display apparatus of the reflection type for a vehicle as claimed in claim 5, wherein said hologram of the non-regular reflection type has an incidence angle of the display light of said display unit which has an absolute value lower than the absolute value of a reflection angle of the display light from said hologram of the non-regular reflection type.

7. A display apparatus of the reflection type for a vehicle, comprising:

a display unit;

a combiner formed from a hologram of the regular reflection type including a concave mirror for reflecting display light from said display unit toward a driver of said vehicle so as to allow the driver to visually observe the reflected display light as a virtual image of the display image of said display unit; and a prism interposed in an optical path between said display unit and said combiner for inclining and elongating the virtual image of the display image of said display unit in one direction with respect to the display image.

* * * * *